Figure 1:
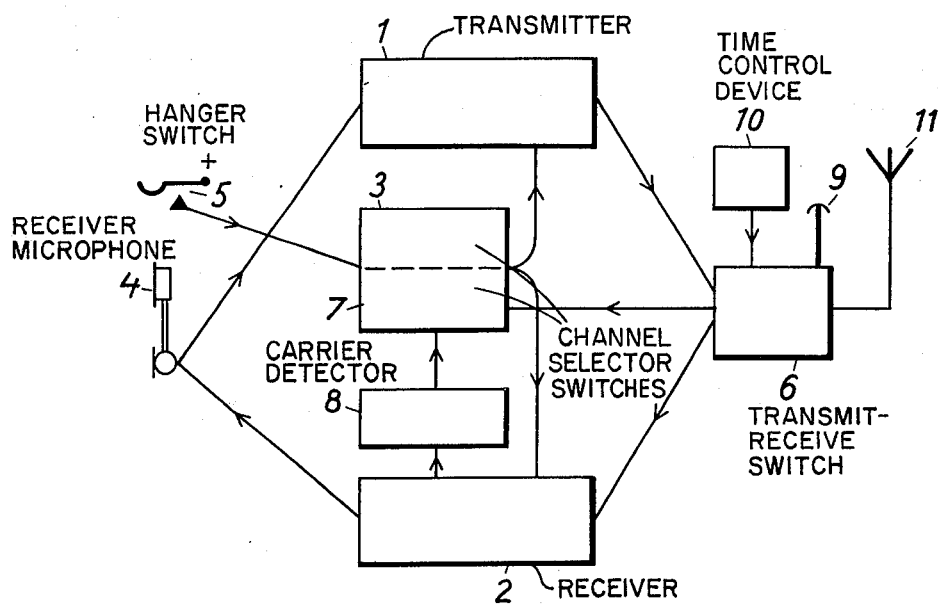

United States Patent [19]
Lundberg

[11] 3,943,444
[45] Mar. 9, 1976

[54] PROCEDURE TO WATCH SEVERAL RADIO CHANNELS AT RADIO COMMUNICATION

[75] Inventor: Karl Bengt Häkan Lundberg, Lidingo, Sweden

[73] Assignee: Telefonaktiebolaget L M Ericsson, Stockholm, Sweden

[22] Filed: Dec. 4, 1974

[21] Appl. No.: 529,395

[30] Foreign Application Priority Data
Dec. 21, 1973   Sweden ............................... 7317372

[52] U.S. Cl. ...................... 325/25; 325/55; 325/64; 343/176
[51] Int. Cl.² .......................................... H04B 1/40
[58] Field of Search ............ 325/25, 51, 53, 55, 57, 325/64, 15; 343/175, 176, 178

[56] References Cited
UNITED STATES PATENTS
3,832,636   8/1974   Kubo ................................... 325/25

Primary Examiner—Robert L. Griffin
Assistant Examiner—Marc E. Bookbinder
Attorney, Agent, or Firm—Hane, Baxley & Spiecens

[57] ABSTRACT

During communication in a system for radio communication where stations are called with selective calls the participating stations watch for priority calls on a number of other radio channels. The watching is performed by listening in to the other channels at each switching from transmission to reception and vice versa and also at time intervals if the switching is overly late.

6 Claims, 3 Drawing Figures

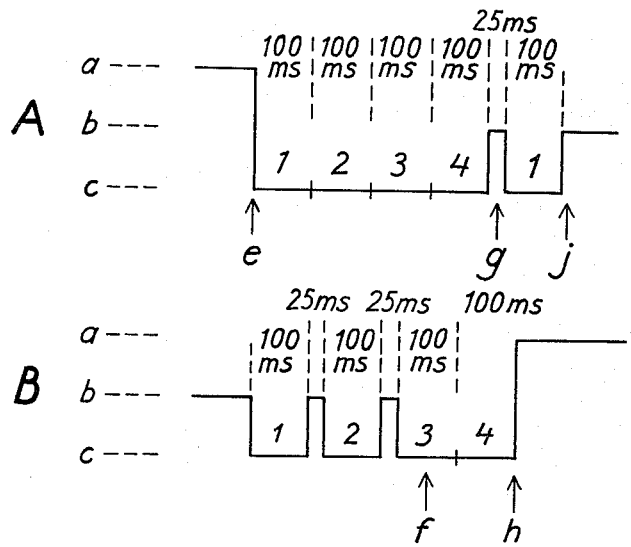
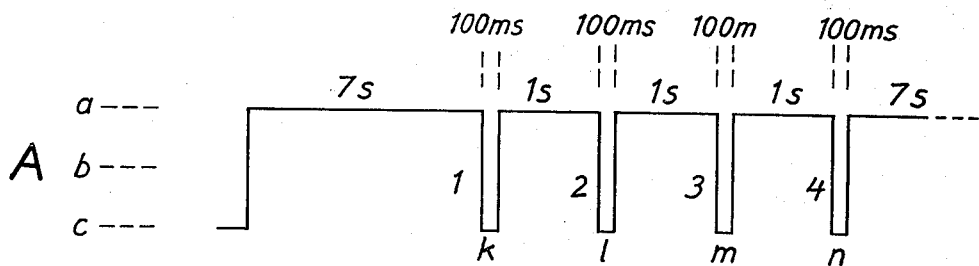
Fig.2
Fig.3

PROCEDURE TO WATCH SEVERAL RADIO CHANNELS AT RADIO COMMUNICATION

The present invention refers to a method to keep watch in a radio communication system for calls directed to stations in the system which are engaged in communication. The procedure or method is specially intended to be applicable when some calls have higher priority than calls in general, and when calls with high priority may occur on more than one radio channel.

To watch means in radio communication to listen for calls to ones own station.

The stations participating in a communication, for example a conversation, cannot be reached by calls from other stations while the conversation continues. It is desirable in many cases that continuing conversations can be interrupted so that calls with higher priority may be allowed.

Known procedures for watching of priority calls consist in that calls to a station are listened to with an extra receiver during the time when the regular receiver of the station is occupied with a conversation. If a call is received at the extra receiver a signal is emitted which is discernible to the operator of the station.

Another known procedure is that the regular receiver of the station at times determined by a clock is switched from the continuing call and to the listening for calls on another radio channel. This listening takes place each time for such a short time that the continuing call is disturbed only insignificantly as long as the switching is done fairly seldom. If calls on several radio channels are watched in this manner the breaks need to be repeated so often that the disturbance in the continuing call becomes unacceptably strong.

With the procedure according to the invention, calls on several radio channels, for example four, can be watched from one receiver without the drawbacks which affect the usual procedures for watching. The procedure is characterized in that the radio channels on which calls are expected are listened to while both the stations participating in a conversation switch from sending to reception and vice versa. Time controlled breaks in the conversations are also appropriated, but only if the intervals between the switchings become too long. Because the breaks in the calls are preferably attributed to the switchings between sending and reception when some waiting time would occur normally, a minimum of disturbance in the conversations is obtained.

The invention will be described more in detail in connection with an example of a radio communication system and with reference to the accompanying drawing, where FIG. 1 schematically shows the parts of a station included in the radio communication system, and FIGS. 2 and 3 show timing diagrams of procedures for watching according to the invention.

The procedure according to the invention is intended to be used in a radio communication system in which there is included several radio stations such as the one shown in FIG. 1. Most of the stations are arranged for sending and reception on several radio channels with separate carrier frequencies.

Each radio station contains a transmitter 1 arranged for sending over a transmit-receive antenna 11 selective calls, i.e. calls which are encoded to be received only by a selected receiver. The receiver 2 is a superheterodyne receiver whose local oscillator contains tuning circuits for a number of frequencies. The receiver 2 is also provided with a decoding device arranged for sorting out the call directed to the station. Transmitter-receiver stations with encoding-decoding means are already known, e.g. see U.S. Pat. No. 3,175,191.

The receiver of the station comprises a first channel selector switch 3 which is arranged to alter the frequency of the local oscillator. A channel selector switch with this arrangement and also arranged to test several radio channels and to stop at a channel where a carrier is indicated is described in Swedish Pat. No. 360,234 laid open for publication 17 Sept. 1973 which is based on U.S. Pat. application No. 848,628, Aug. 8, 1969, of R. H. Chapman et al now U.S. Pat. No. 3,614,621 and assigned to Motorola, Inc. The first channel selector switch is arranged for beginning its scanning over the channels when the station is switched on.

A second channel selector switch 7 which is connected to the receiver 2 and the transmitter 1 is similar to the first channel selector switch 3, only that it switches a limited number of channels, four channels in this example.

A carrier detector 8 which is connected to the receiver 2 is of the type which is normally inherent in a squelch control and is described e.g. in U.S. Pat. No. 3,832,636.

A transmit-receive switch 6 is provided for switching the station between transmitting and receiving. The switch is arranged to be controlled from a control pushbutton 9 and also from a time control device 10 which comprises an analog time circuit with a loaded capacitor, thus a circuit known per se.

The station comprises also a receiver-microphone 4, a hanger switch 5 and an antenna 11.

When a certain receiving station is to be called from a transmitting station a call selector at the station is set to the intended calling code and a call button is operated. The channel switch 3 at the transmitter station proceeds with the continuous scanning and stops at the first free channel found. After this, coded calling signals are sent during a time determined in advance. On condition that the called station is free, its channel switch scans all channels on which calls may occur, and when a coded call is received which is directed to this receiver, it is registered in the called station, after which its transmitter sends an acknowledgement signal, and a signal lamp is lit as a token of a received call.

At the calling station, the channel switch has stopped at the channel where the call is sent, and at reception of the acknowledgement signal a signal lamp is lit at the station. The operator of the station lifts in this connection the receiver 4 of the station whereby the calling station is ready to receive a spoken answer from the called station.

When the signal for a received call has been noticed by the operator at the called station he lifts its receiver 4, its hanger switch 5 at once causing the channel selector switch 3 to set to the channel on which the call has been received. With the transmit-receive-switch 6 controlled by the transmit button 9, the transmitter of the called station is switched on and a spoken answer of the call is given. Each station included in the system is arranged for alternate transmitting and reception, so called simplex traffic; transmitting or reception are selected with the transmit button 9.

What has been described about the radio communication system is a known technique. In the procedure according to the invention there is included the possibility that watching can be carried out even when conversations between the stations are going on.

The procedure of switching between transmitting and reception is illustrated by FIG. 2 where A designates a time diagram for the sending station and B a time diagram for the receiving station. In the diagram *a* designates setting for sending on a radio channel, *b* setting for reception on the same radio channel, and *c* setting for listening in on a priority channel. In the communication system there is included, besides a number of radio channels, a number of priority channels, for example four, which preferably are intended for the sending of calls with such high priority that the person who receives such a call shall interrupt the continuing conversation.

The procedure at switching in the described example will be as follows:

At *e* in the diagram the transmit button 9 is released at the transmitting station A. This station then is set by the transmit-receive-switch 6 so that, with the aid of the second channel switch 7, it scans all four priority channels in sequence for determining if calls to the station in question are sent on any of these channels. Each channel is listened in for 100 ms.

At the receiving station B there is detected with the aid of the carrier detector 8 that the carrier wave has disappeared. The second channel detector 7 in station B is switched to the priority channel 1 for listening in for 100 ms and thereafter returns to listening on the speech channel. If no carrier is detected the station is switched after 25 ms to listening in on priority channel 2 and so on.

It is presumed in the example that the transmit button 9 in station B is pressed at the time *f*. One priority channel 4 is then not yet scanned, it is switched in immediately after the priority channel 3.

Meanwhile at the station A all priority channels have been scanned and there the set radio channel *b* is now listened to for 25 ms alternately so that the priority channels (1 and so on) are again listened to.

When all priority channels have been scanned at station B this station changes to transmitting at the time *h* in the diagram.

At the same time as transmitting from station B starts an indicating lamp is lit which shows that the operator can start speaking.

At station A there is detected at time *j* that a carrier exists, and consequently the station A stops at a setting for reception on the radio channel and the switching sequence is completed.

If a station happens to be set on transmitting for a long time a time controlled scanning of the priority channels is nevertheless made in the manner which appears from the time diagram in FIG. 3.

When, for example, station A has been set for transmitting for 7 seconds a time control device 10 causes a switching at the time *k* for listening in on priority channel 1 for 100 ms and thereafter a return to transmitting.

At the receiving station B, the disappearance of the carrier is detected at the time *k'*, whereby at this station also the priority channel 1 is listened in during 100 ms after which return takes place to reception on the radio channel.

When one second has passed after the priority channel 1 has been listened in, station A is switched for listening in on priority channel 2 at time 1, and at station B priority channel 2 is listened in at time 1'.

If the transmit button 9 at station A should not be released, all four priority channels are scanned in this manner, and the scanning is repeated 7 seconds after the last priority channel has been listened in.

The times mentioned in the example may be varied within the limits indicated in the claims.

If, at the described listening in on the priority channels, a call has been received at either of the stations participating in the conversation, a visible or audible signal is emitted at this station. At this station the new calling station is switched in in a manner known per se and if it is found suitable, the conversation in progress is terminated and the conversation on the priority channel is commenced.

The described procedure for watching is intended to be used also for other types of radio communication than radio communication with speech.

We claim:

1. In a radio communication system having a plurality of transmitting and receiving stations and a plurality of radio channels which are intended for the transmission of selective calls, the method, while a communication is occurring between a transmitting station having a transmitter and a receiver and a receiving station, having a transmitter and a receiver performed by the transmitting station of watching for calls to the transmitting station on any of a plurality of selected radio channels on which calls are expected, said method comprising the steps of sequentially tuning the receiver of the transmitting station to each of the plurality of selected radio channels and sensing for signals on the selected radio channels for a given period of time whenever the transmitting station is switched from the transmit to receive mode.

2. In a system for radio communication, which comprises a number of transmitting and receiving stations and a number of radio channels, and which is intended for the transmission of selective calls, the method while a communication between a transmitting and a receiving station, each including a transmitter on over a first communications channel, of watching a number of selected radio channels, on which calls are expected, for calls to the stations, said method comprising the steps:

tuning the receiver of the transmitting station to each selected radio channel in turn and listening for a given period of time for calls directed to the transmitting station each time the transmitting station is switched from transmission to reception; and tuning the receiver of the receiving station to each selected radio channel in turn and listening for said given period of time for calls directed to the receiving station at each break in reception of signals from the transmitting station where the tuning to each selected radio channel is separated by tuning to the normal communication channel for a period of time which is a fraction of said given period of time.

3. The method of claim 2 further comprising the step of periodically tuning the receivers of the transmitting and receiving stations to the selected radio channels whenever there is no switch between transmitting and receiving for a specified length of time.

4. The method of claim 3 wherein said specified length of time is between five and fifteen seconds.

5. The method of claim 4 wherein calls on the selected radio channels have priority over other communications in the system.

6. The method of claim 2 further comprising the step of emitting a user recognizable signal whenever a call is detected on one of the selected radio channels.

* * * * *